(12) United States Patent
Wen et al.

(10) Patent No.: US 6,590,590 B1
(45) Date of Patent: Jul. 8, 2003

(54) SYSTEM AND METHOD FOR UPDATING A GRAPHIC REPRESENTATION OF A WINDOW ITEM USING AN IMAGE INFORMATION READING APPARATUS

(75) Inventors: Nora Wen, Hsin Chu (TW); Gimmy Huang, Tao Yuan (TW); Jenny Kao, Taipei (TW)

(73) Assignee: Mustek Systems, Inc., Hsin Chu (TW)

( * ) Notice: Subject to any disclaimer, the term of this patent is extended or adjusted under 35 U.S.C. 154(b) by 515 days.

(21) Appl. No.: 09/588,524

(22) Filed: Jun. 6, 2000

(51) Int. Cl.$^7$ ................................................. G09G 5/00
(52) U.S. Cl. ....................................... 345/764; 345/810
(58) Field of Search ............................... 345/744–747, 345/764, 810, 861, 866, 867, 700, 835–839

(56) References Cited

U.S. PATENT DOCUMENTS 5,905,492 A * 5/1999 Straub et al. ................ 345/744
6,392,671 B1 * 5/2002 Glaser ......................... 345/765

OTHER PUBLICATIONS

Screendumps of MS Windows 98 and IrfanView Vers. 3.05 (1998 and 1999 respectively).*

Webshots Debuts Community Photo Sharing Feature ; Unique Service Turns Family Photos into Instant Computer Wallpaper. (Business Wire, Aug. 10, 1999).*

* cited by examiner

Primary Examiner—Sy D. Luu
(74) Attorney, Agent, or Firm—Bacon & Thomas, PLLC

(57) ABSTRACT

A method and system is implemented on a host computer for operating upon a window system to update a graphic representation of a selected window item using an image information reading apparatus. The invention mainly includes an image cropping manager for providing a cropped image by cropping an image transmitted from the image capturing manager according to a size requested by a user; and an interface manager for providing a plurality of menu items each associated with at least a dialog box for setting the cropped image as a default image of a selected menu item. The plurality of menu items include Startup Screen, Wall Paper, System LOGO, Icon, Cursor, Screen Saver, Shutdown Screen, Theme, and Restore for updating an associated graphic representation. Eventually, an user can easily establish a personalized windows graphic environment with the assistance of the invention.

8 Claims, 12 Drawing Sheets

SYSTEM AND METHOD FOR UPDATING A GRAPHIC REPRESENTATION OF A WINDOW ITEM USING AN IMAGE INFORMATION READING APPARATUS

BACKGROUND OF THE INVENTION

A. Field of the Invention

The present invention relates to a method and system for updating a graphic representation of a window item, especially to a system and method that operates on a window system to update a graphic representation of a window item using an image information reading apparatus, thereby to provide a personalized window display environment.

B. Description of the Prior Art

The current windows system provides graphic interfaces for the convenience of applications. The window systems usually provide a few figures or images selectable for changing the graphic representation of a window item, such as Icon, Wallpaper, or Cursor etc. according to a user's favorite choice. The users can also download new graphics or images from the shareware in the Internet to replace an old graphic representation of a window item. Although the graphics or images in the shareware are full of variety, they are still not enough to satisfy users with a wide range of diverse interests and favorites. To establish a personalized or unique graphic representation of a window item, the users must be familiar with system configurations and computer operations. It would be difficult for an ordinary end user to have such a level of computer proficiency if he/she wants to establish a personalized window graphic environment without any assistance.

SUMMARY OF THE INVENTION

Accordingly, the primary object of the present invention is to provide a system and method which can be integrated with the existing window system, thereby to assist an end user to quickly update the graphic representation of a window item using an image information reading apparatus. Eventually, the users can easily update the graphic representation of a window item, such as System LOGO, Icons, or Cursors, using a scanner or a digital camera, thereby to establish a personalized windows graphic environment.

In accordance with the invention, the method and system is implemented on a host computer for operating upon a window system to update a graphic representation of a selected window item using an image information reading apparatus. The invention mainly includes an image cropping manager for cropping and saving a scanned image transmitted from the image capturing manager; and an interface manager for providing a plurality of menu items each associated with at least a dialog box for setting the scanned image as a default graphic representation of a selected window item. The menu items include Startup Screen, Wall Paper, System LOGO, Icon, Cursor, Screen Saver, Shutdown Screen, Theme, and Restore for updating the graphic representation of an associated window item. The operations of the menu items can also be directly activated from the image information reading apparatus. On the housing of the image information reading apparatus, there are a few hot keys for the purpose of configuration settings. Each hot key is associated with at least one of the menu items. One touch on the hot key of the housing will activate a series of associated computer operations to update a graphic representation of a window item. Eventually, an end user can easily establish a personalized windows graphic environment with the assistance of the invention.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
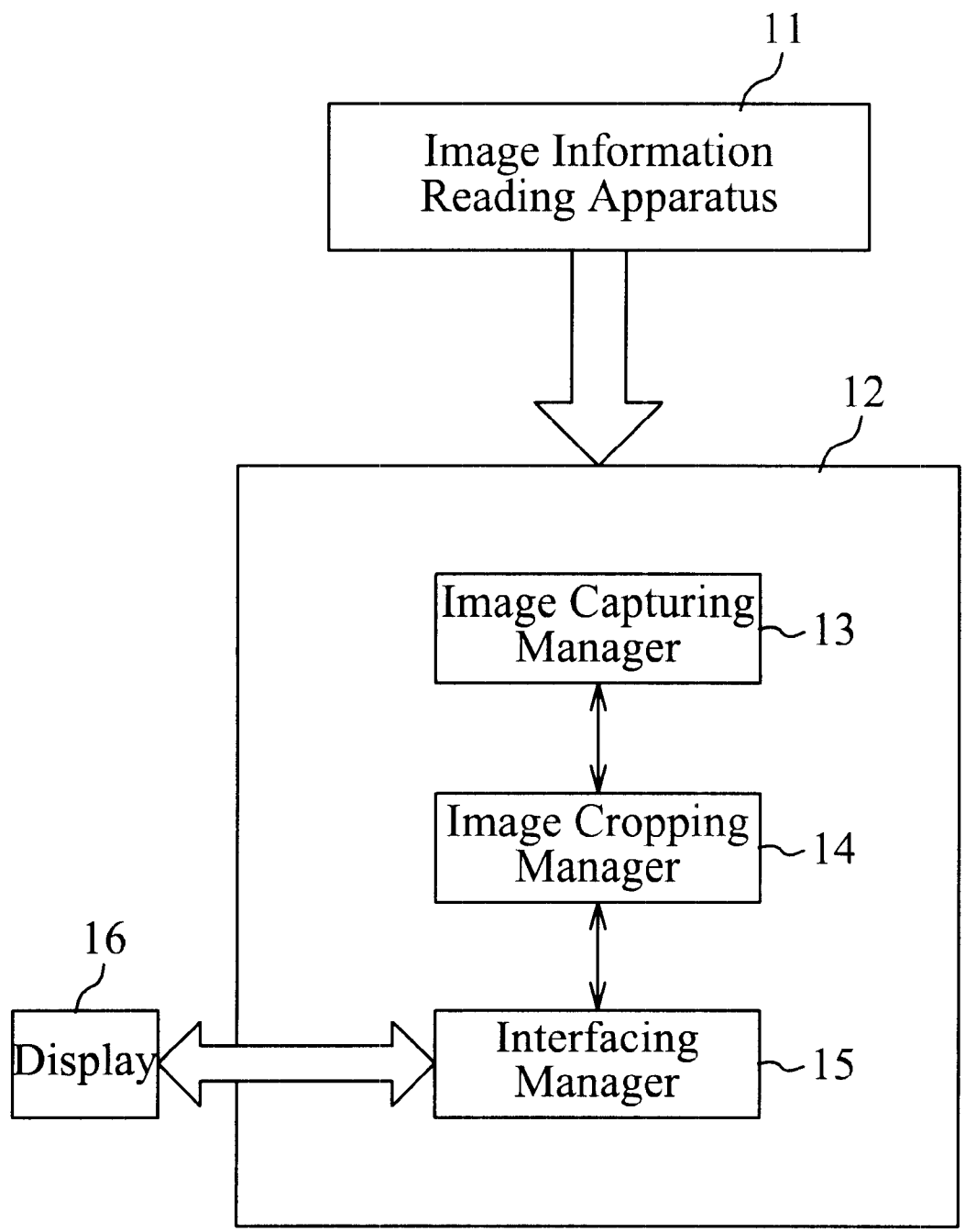
FIG. 1 is a block diagram showing a general-purpose computer system connected to an image information reading apparatus for practicing a preferred embodiment of the present invention.

In a preferred embodiment, the method and system of the present invention are implemented on a general purpose computer which has a central processing unit, storage devices, a display, and conventional input/output devices, such as a keyboard, and a computer mouse. Refer to FIG. 1, the invention is implemented on a host computer 12. The host computer 12 is connected to an image information reading apparatus 11, such as optical scanners, digital cameras, copy machines, and facsimiles for obtaining an image to replace a graphic representation of a designated window item. The image information reading apparatus 11 has a few configuration settings on the housing, such as buttons or hot keys, for directly setting the scanned image as the default graphic representation of a designated window item. Each configuration setting is associated with at least one of the menu items for updating a window item. One touch on the hot key of the housing will invoke a series of associated computer operations to update a newly selected image as a default graphic representation of a designated window item.

The computer system 12 includes an image capturing manager 13, such as a driver, for communicating with the image information reading apparatus 11 and the host computer 12. The image capturing manager 13 reads the scanned image transmitted from the image information reading apparatus 11 and processes the commands of the hot keys for forwarding to the host computer 12.

Figure 2:
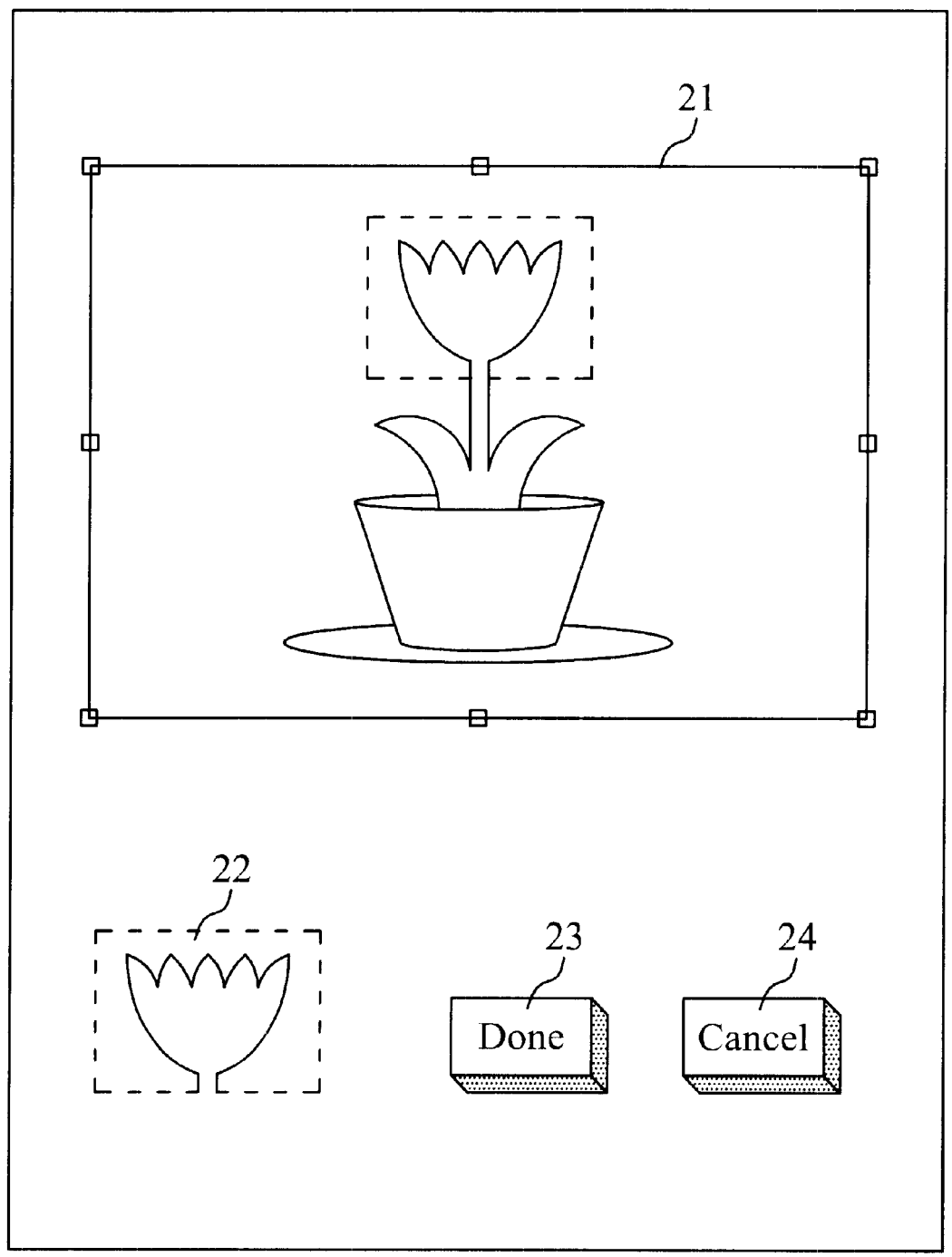
FIG. 2 is an example dialog box for showing the image cropping manager according to the preferred embodiment of the present invention.

The image cropping manager 14 provides a dialog box to interact with an end user for processing the scanned images transmitted from the image capturing manager 13 in response to a request command of a user as illustrated in FIG. 2. The image cropping manager 14 is provided for automatically cropping an image according to a default image size. It should be noticed that the image cropping manager 14 can crop the image either in a shape of a rectangle box or along the border lines of an object which may be irregular. Accordingly, when the image cropping manager 14 displays the scanned image on the frame 21, the image will be automatically circumscribed from its border lines or in a shape of a rectangle box and then cropped. An end user can also select an area of interest from the scanned image for representing a graphic representation of a smaller window item, such as a cursor. If the user drags the mouse to select a portion of the image from the frame 21, the selected area will be automatically displayed on the preview frame 22. The size of the preview frame 22 is equal to the size of a conventional cursor so that the user can conveniently preview the result of the newly updated cursor. The user can immediately determine if the updated image for the cursor will be adopted by clicking the "Done" button 23 or "Cancel" button 24.

Figure 3:
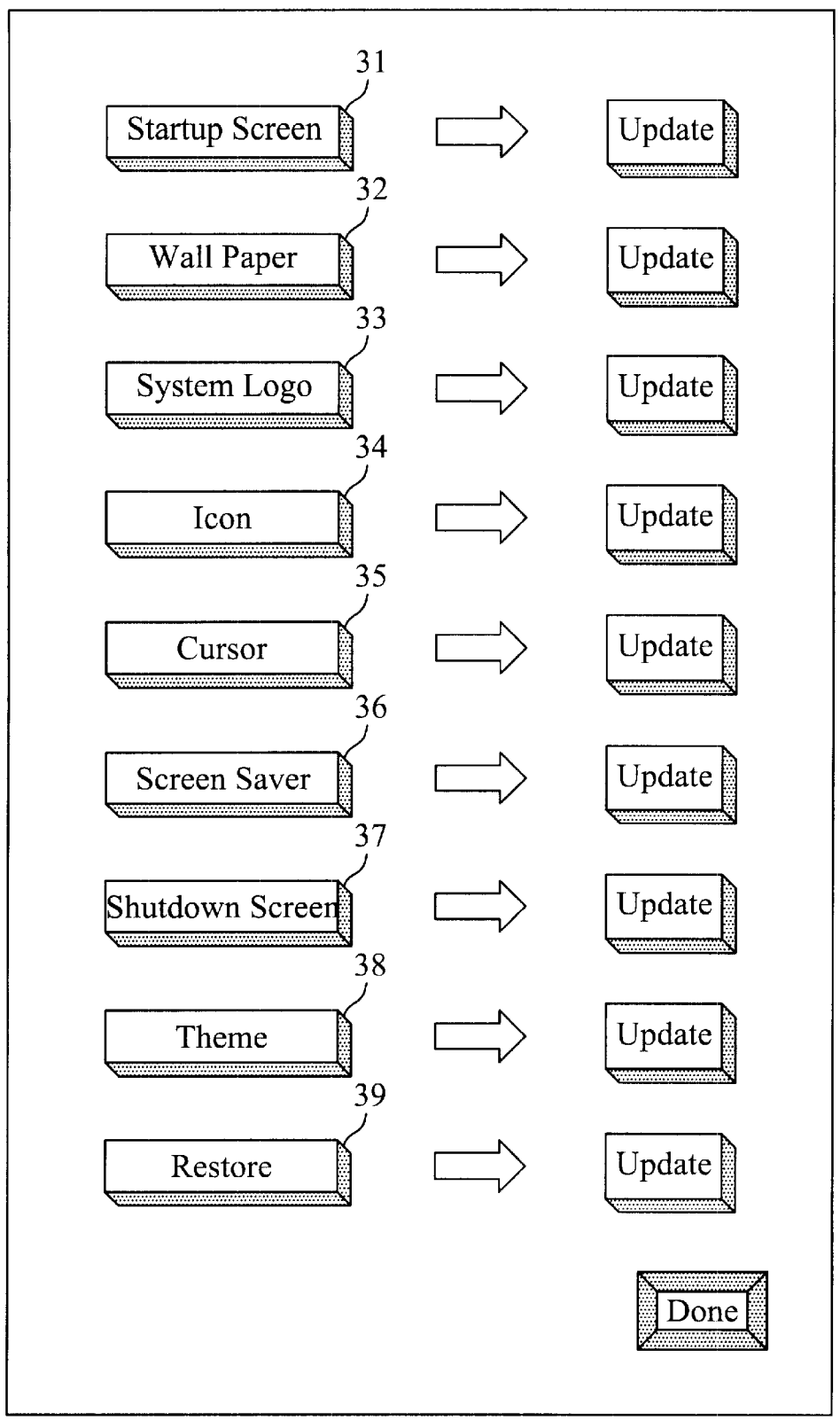
FIG. 3 is an example dialog box for showing the interface manager according to the preferred embodiment of the present invention.

The interface manager 15 of the invention can be implemented on a conventional Window system which supports interprocess communication and drag-drop direct manipulation using a computer mouse. The interface manager 15 displays a dialog box on the display 16 to interact with an end user. Refer to FIG. 3, the dialog box of the interface manager 15 provides various menu items selectable for updating a window item. Take Microsoft® Windows™ system as an example, a graphic or an image of a window item that can be updated by a user includes Startup Screen, Wall Paper, System LOGO, Icon, Cursor, Screen Saver, Shutdown Screen, and Theme. Accordingly, the interface manager 15 provides various associated functions for the user to choose, including Startup Screen 31, Wall Paper 32, System LOGO 33, Icon 34, Cursor 35, Screen Saver 36, Shutdown Screen 37, Theme 38 and Restore 39. Clicking on each menu item will activate associated routines.

Figure 4:
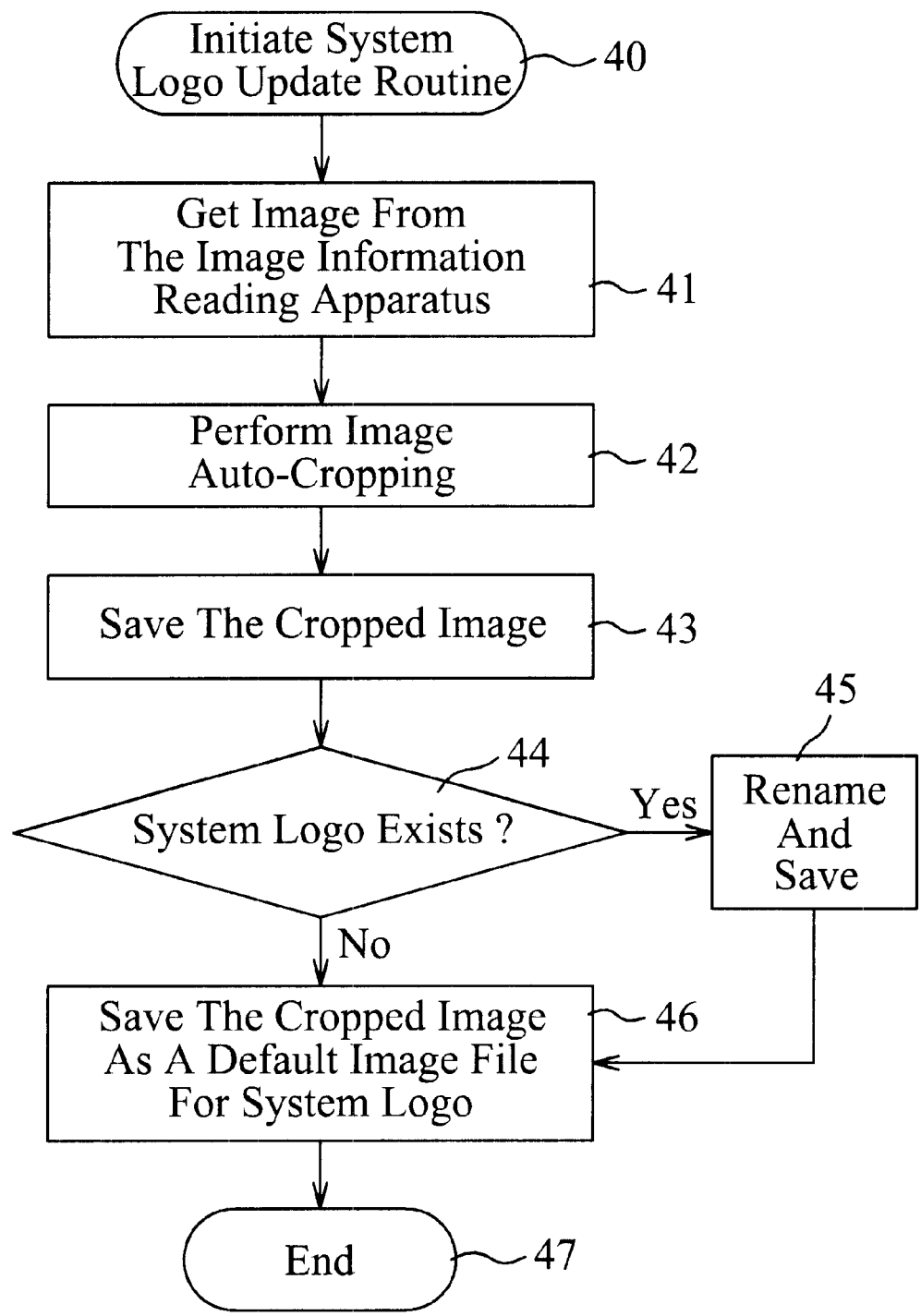
FIG. 4 is a flow diagram of the System Logo update routine.

The user can determine which update routine to be activated by clicking the associated menu item on the dialog box of interface manager 15. The operations of each menu item is described in detail as follows:

1. System LOGO Update routine: With reference to FIG. 4, step 40, when the menu item of System LOGO is selected, the interface manager 15 will invoke the System LOGO Update routine to read the image data of the scanned image. And then, at step 41, the image capturing manager 13 gets the scanned image from the image information reading apparatus 11 to be read by the image cropping manager 14. Step 42, the user can directly perform image auto-cropping on the image cropping manager 14. Then at step 43, the cropped image will be automatically saved. At step 44, check if the System LOGO already exists? If yes, go to step 45. If not, go to step 46. At step 45, since the System LOGO already exists, so the original file name for the image of the System LOGO will be renamed and saved in another directory, and then go to step 46. At step 46, the target image will then be saved as the default file name for system LOGO under windows system directory, such as oemlogo.bmp. And the system file under windows system directory, such as oeminfo.ini, must also be updated in accordance with the new image file. Then, at step 47, the update routine is complete and then terminated.

Figure 5:
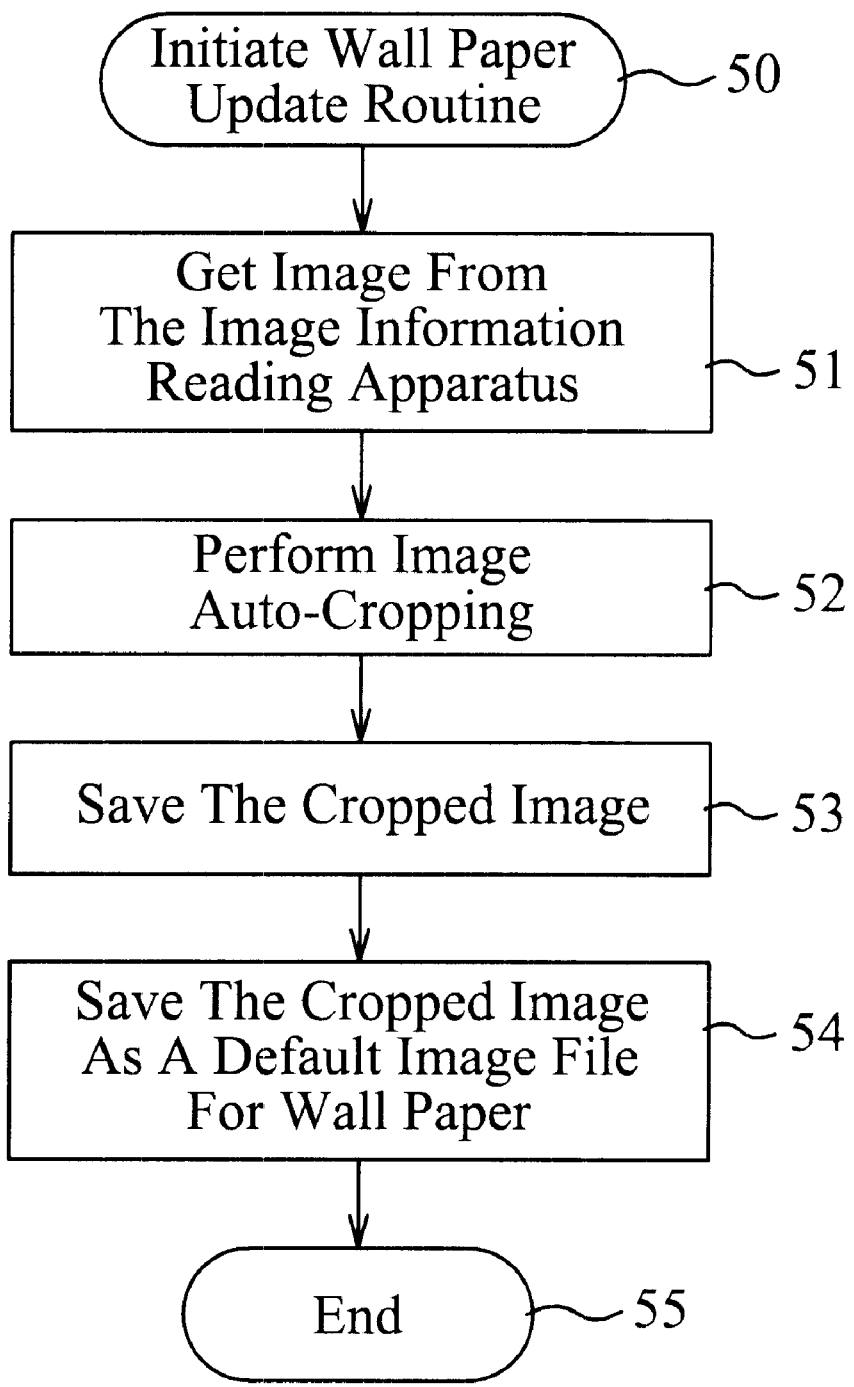
FIG. 5 a flow diagram of the Wall Paper update routine.

2. Wall Paper Update routine: Refer to FIG. 5, step 50, when the menu item of Wall Paper is selected, the interface manager 15 will invoke the Wall Paper Update routine to read the image data of the scanned image. And at step 51, the image capturing manager 13 gets the scanned image from the image information reading apparatus 11 to be displayed on the image cropping manager 14. Then, at step 52, the user can directly perform image auto-cropping on the image cropping manager 14. At step 53, the cropped image will be automatically saved. At step 54, the target image will then be saved as the default file name for Wall Paper. Then, at step 55, the update routine is complete and terminated.

Figure 6:
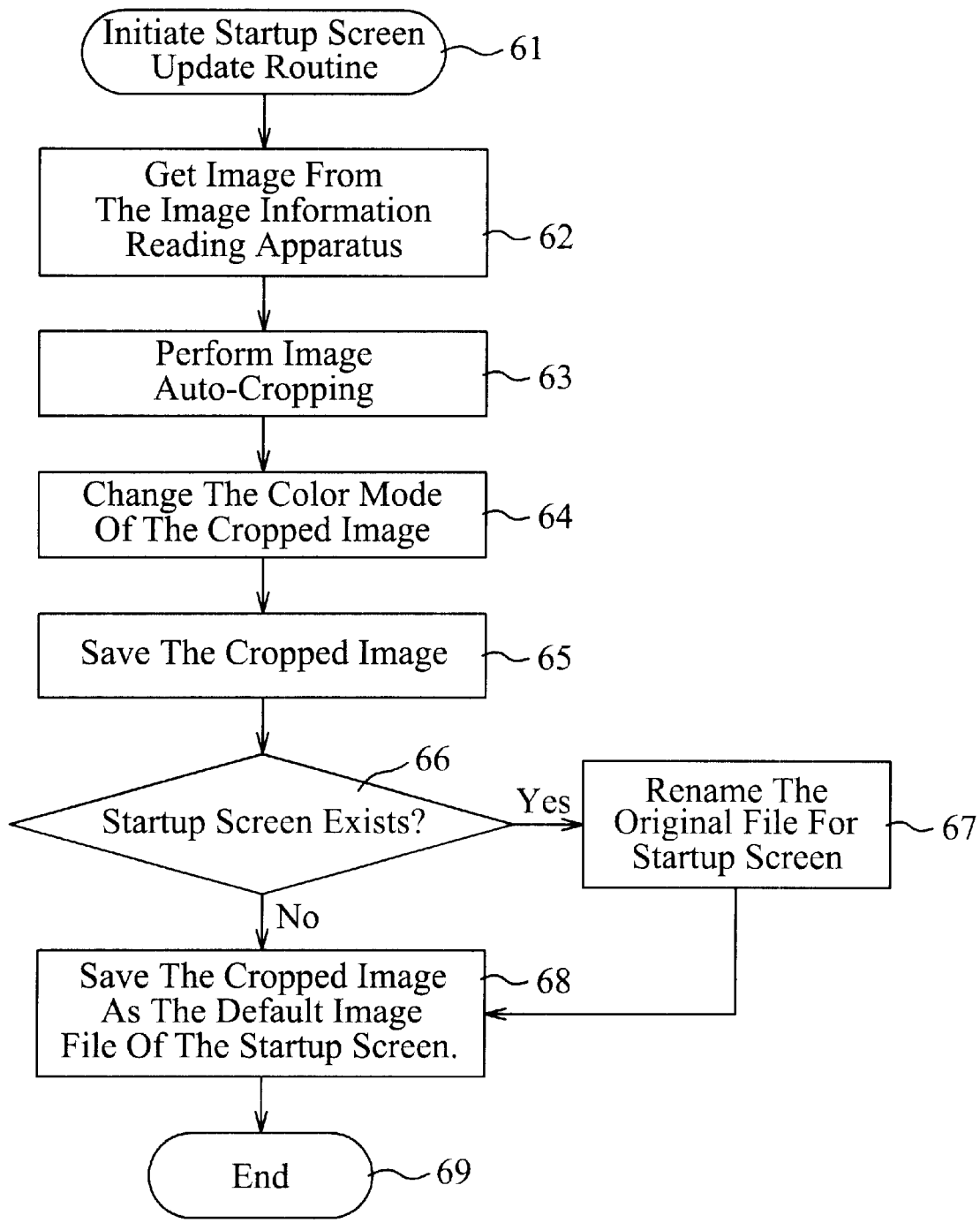
FIG. 6 is a flow diagram of the Startup update routine.

3. Startup Screen Update routine: Refer to FIG. 6, step 61, when the menu item of Startup Screen is selected, the interface manager 15 will invoke the Startup Screen Update routine to read the image data of the scanned image. At step 62, the image capturing manager 13 gets the scanned image from the image information reading apparatus 11 to be displayed on the image cropping manager 14. Step 63, the user can directly perform image auto-cropping on the image cropping manager 14. Then, at step 64, the color mode of the scanned image can be optimized according to a current environment, such as 256 colors, for example. Then, at step 65, the new image file will be saved. At step 65, determine if the Startup Screen file exists? If yes, go to step 67 to rename the original default filename for Screen Saver under the windows system directory or save to another path. And then, go to step 68. Step 68, if the Startup Screen file does not exist, save the scanned image as the default file name for Startup Screen under the windows system directory. Then, at step 69, the update routine is complete and then terminated.

Figure 7:
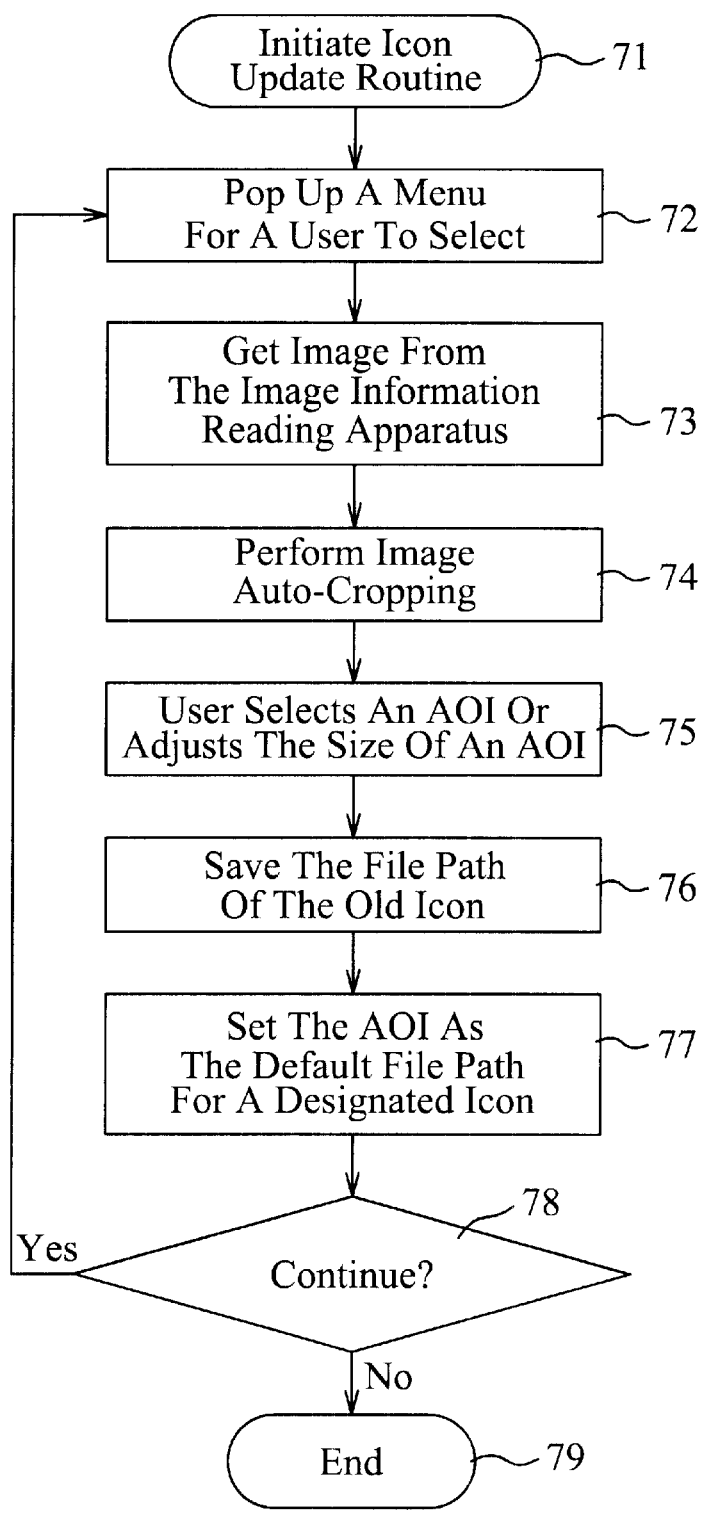
FIG. 7 is a flow diagram of Icon update routine.

4. Icon Update routine: Take Microsoft Windows system for an example. It allows users to update graphic representations of windows items, such as "My Computer", "Recycle Bin", "Network Neighborhood". Since there are many menu items available for updating a designated window item, so a floating menu is provided for the user to select a window item for update. With reference to FIG. 7, step 71, when the menu item of Icon is selected, the interface manager 15 will invoke the Icon Update routine. Step 72, a floating menu is popped up for the user to select a designated icon to be updated. Step 73, the image capturing manager 13 gets the scanned image from the image information reading apparatus 11 to be read by the image cropping manager 14. Step 74, the user can directly perform image auto-cropping on the image cropping manager 14. Then, at step 75, the image cropping manager 14 shows a dialog box for the user to select an area of interest or adjust the size of the image to be adapted to a default frame size 72×72 for an icon. Then, at step 76, save the file path of the old Icon. At step 77, rename the original default file name of the old Icon, and then save the target image file of the new Icon as the default file name of the Icon. Step 78, return to the main menu of the interface manager 15 for the user to determine whether to continue another Icon update routine or to stop. If the user chooses to continue, then go to step 72 to select a new Icon for performing the update routine. If the user chooses to stop, then go to step 79 to close the dialog box and then stop.

Figure 8:
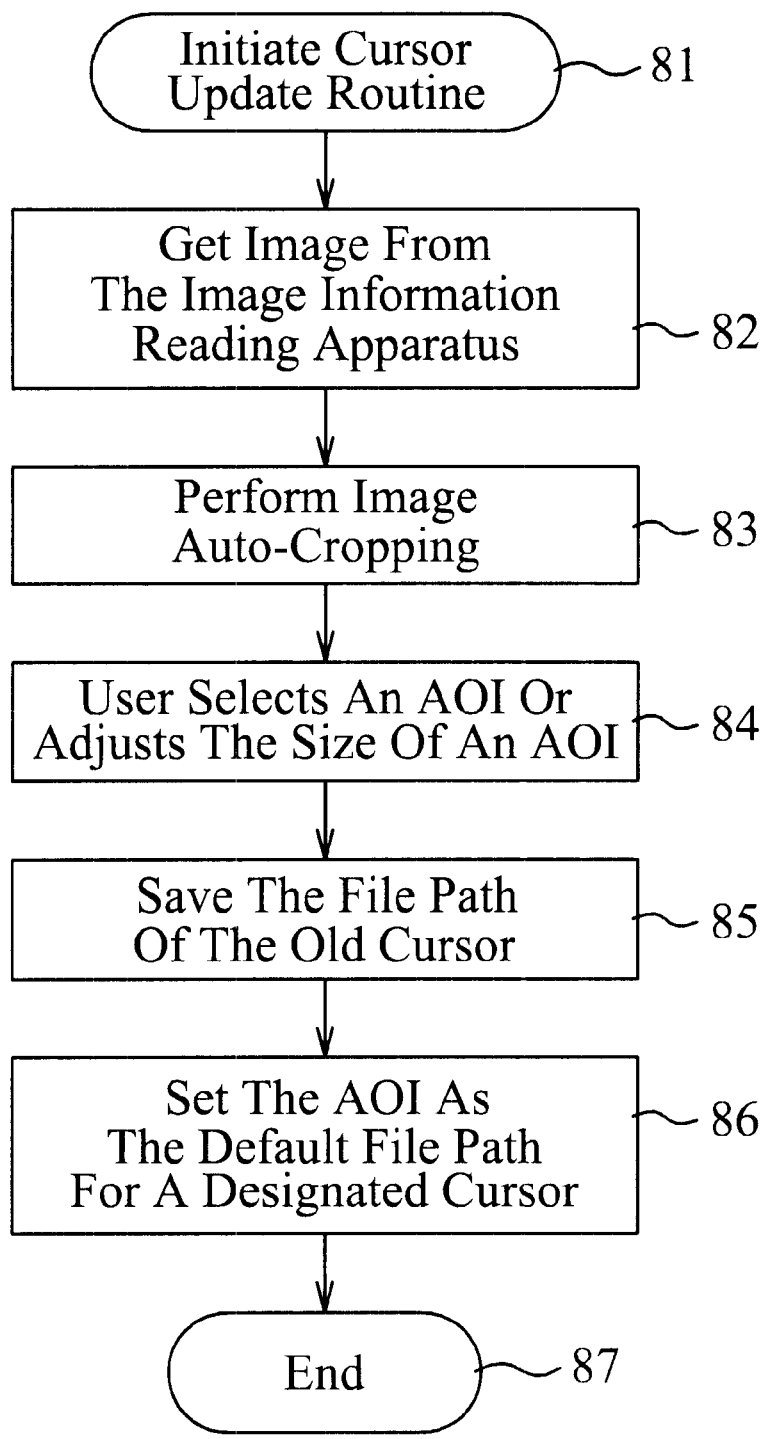
FIG. 8 is a flow diagram of the Cursor update routine.

5. Cursor Update routine: Refer to FIG. 8, step 81, when the menu item of Cursor is selected, the interface manager 15 will invoke the Cursor Update routine to read the image data of the scanned image. And then, at step 82, the image capturing manager 13 gets the scanned image from the image information reading apparatus 11 to be read by the image cropping manager 14. Then, at step 83, the user can directly perform image auto-cropping on the image cropping manager 14. At step 84, the image cropping manager 14 pops up a dialog box for interacting with the user to crop an area of interest or adjust the size of the scanned image to fit a default frame size for the Cursor, such as 72×72. Then, at step 85, save the file path of the old Cursor. At step 86, rename the default file name of the previous Cursor image file, and then save the target image file as the default file name of the standard arrow Cursor. Step 87, the update routine is complete and terminated.

Figure 9:
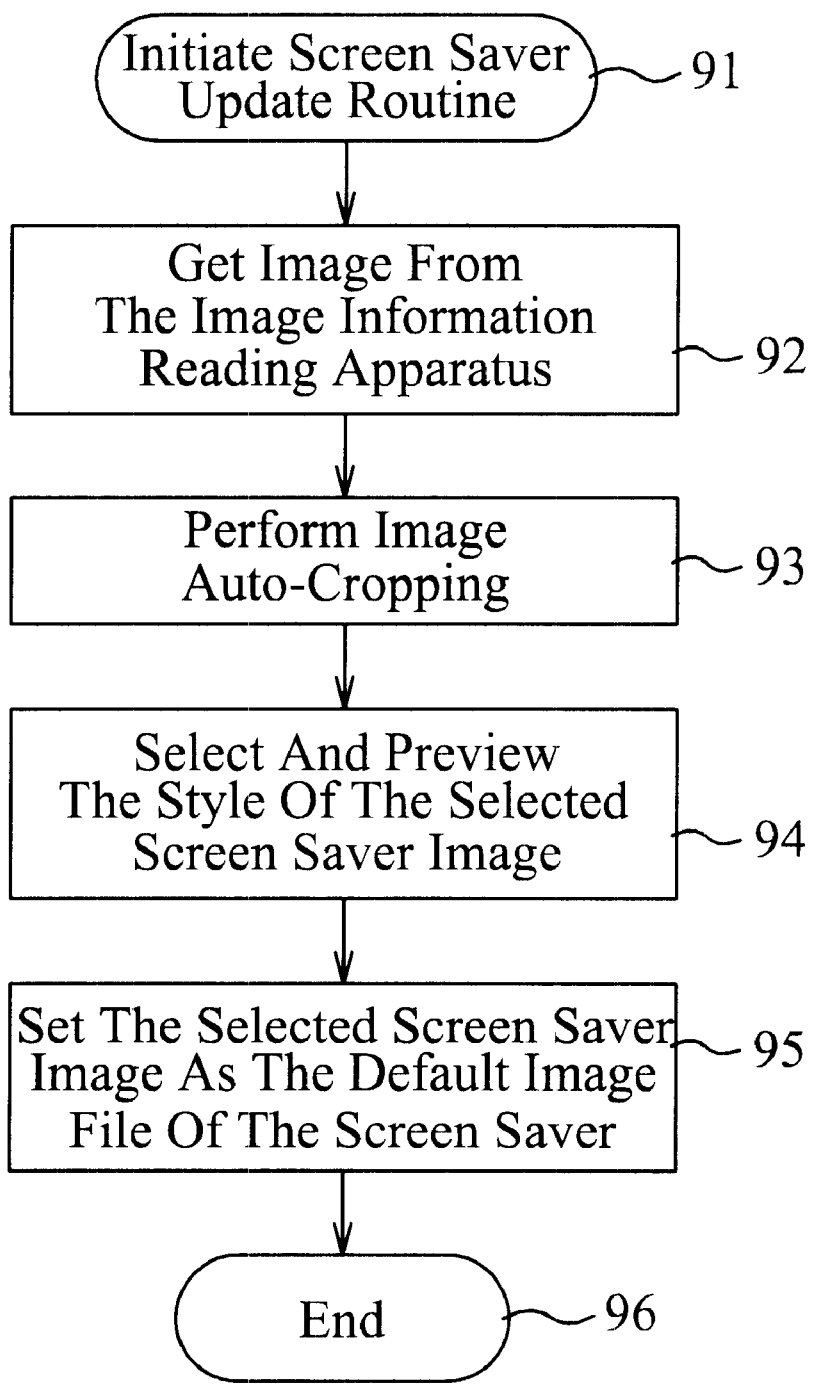
FIG. 9 is a flow diagram of the Screen Saver update routine.
Figure 10:
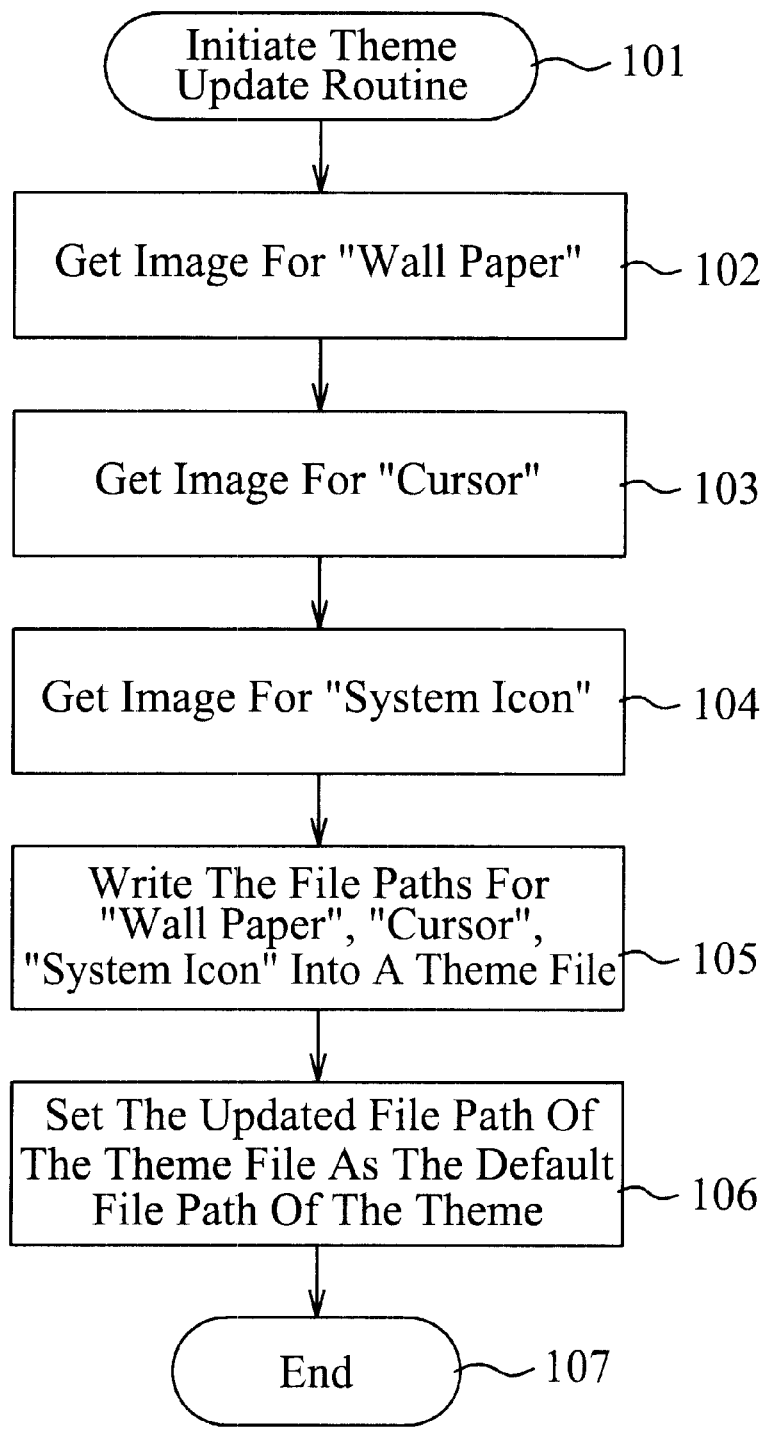
FIG. 10 is a flow diagram of the Theme update routine.

6. Screen Saver Update routine: Refer to FIG. 9, step 91, when the menu item of Screen Saver is selected, the interface manager 15 will invoke the Screen Saver Update routine to read the image data of the scanned image. Then, at step 92, the image capturing manager 13 gets the scanned image from the image information reading apparatus 11 to be read by the image cropping manager 14. At step 93, the user can directly perform image auto-cropping on the image cropping manager 14. At step 94, the image cropping manager 14 pops up a dialog box for interacting with the user to select the style of the screen saver, and preview the result. Then, at step 95, save the target image file for the new screen saver as the default file name of the Screen Saver. Then, at step 96, the update routine is complete and terminated.

7. Theme Update routine: Take Microsoft Window system as an example. The "Theme" is a text file for recording each file path required for the window item "theme", including "wall paper", "cursor", "My computer", "Recycle Bin", etc. At step 101, when the menu item of Theme is selected, the interface manager 15 will invoke the Theme Update routine to read the images for Wall Paper, Cursor, and System Icons from the image capturing manager 13 respectively, steps 102~104. Then, at step 105, write the target image file path for Wall Paper, Cursor, and System Icon into a Theme file. Then, at step 106, save the new Theme file as the default theme file path. Then, at step 107, the update routine is complete and terminated.

Figure 11:
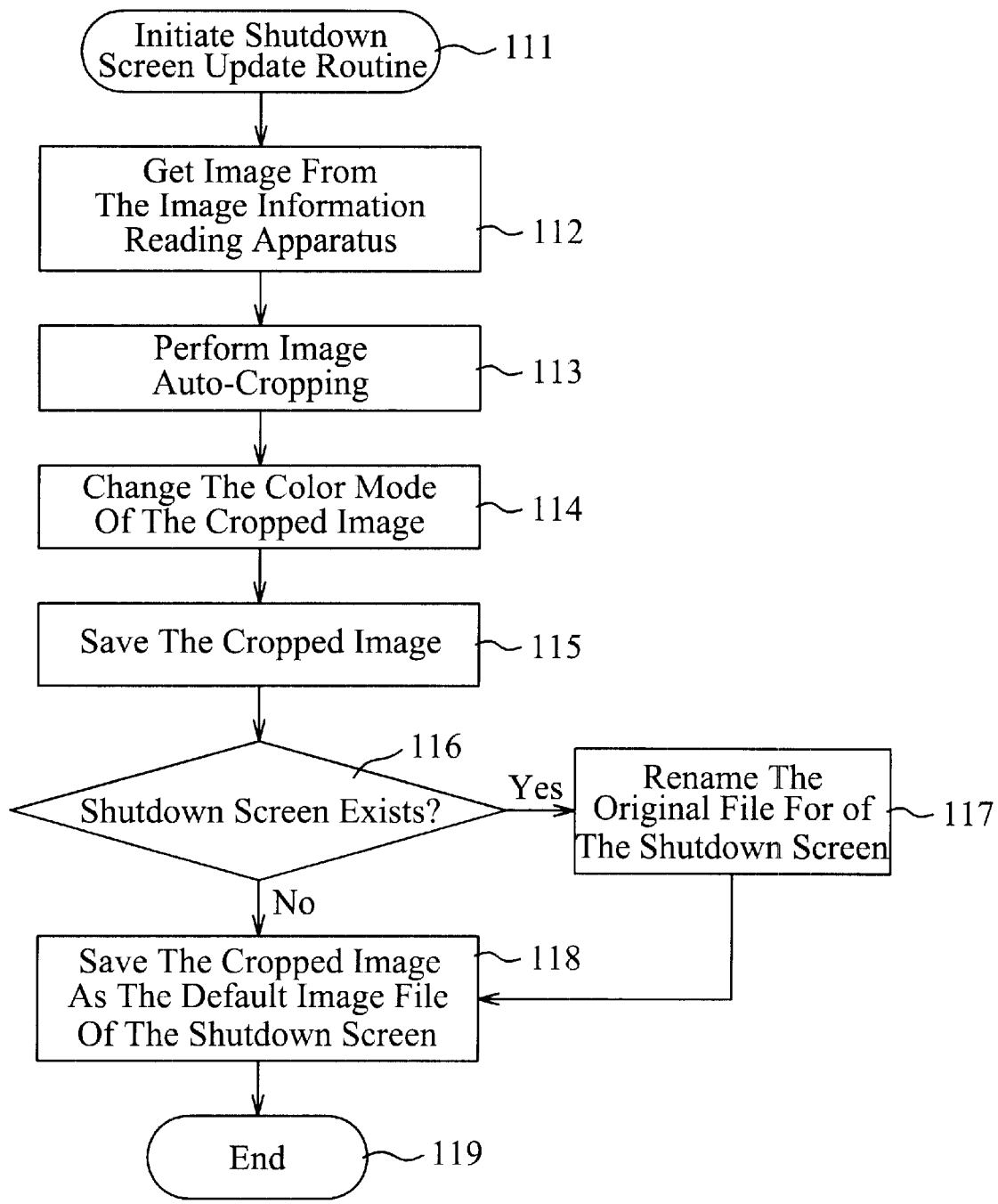
FIG. 11 is a flow diagram of the Shutdown Screen Update routine.

8. Shutdown Screen Update routine: Refer to FIG. 11, at step 111, when the menu item of Shutdown Screen is selected, the interface manager 15 will invoke the Shutdown Screen Update routine to read the image data of the scanned image. And then, at step 112, the image capturing manager 13 gets the scanned image from the image information reading apparatus 11 to be displayed on the image cropping manager 14. Then, at step 113, the user can directly perform image auto-cropping on the image cropping manager 14. At step 114, the user may change the color mode of scanned image to 256 colors. And then, at step 115, the scanned image file is saved. At step 116, the user checks if the Startup Screen file exists. If yes, go to step 117 to rename the file "logow.sys" and saved it in another directory under window system directory, and then go to step 118. On the other hand, if the Startup Screen file does not exist, go to step 118 to save the scanned image to "logow.sys" under windows system directory. Then, at step 119, the update routine is complete and terminated.

Figure 12:
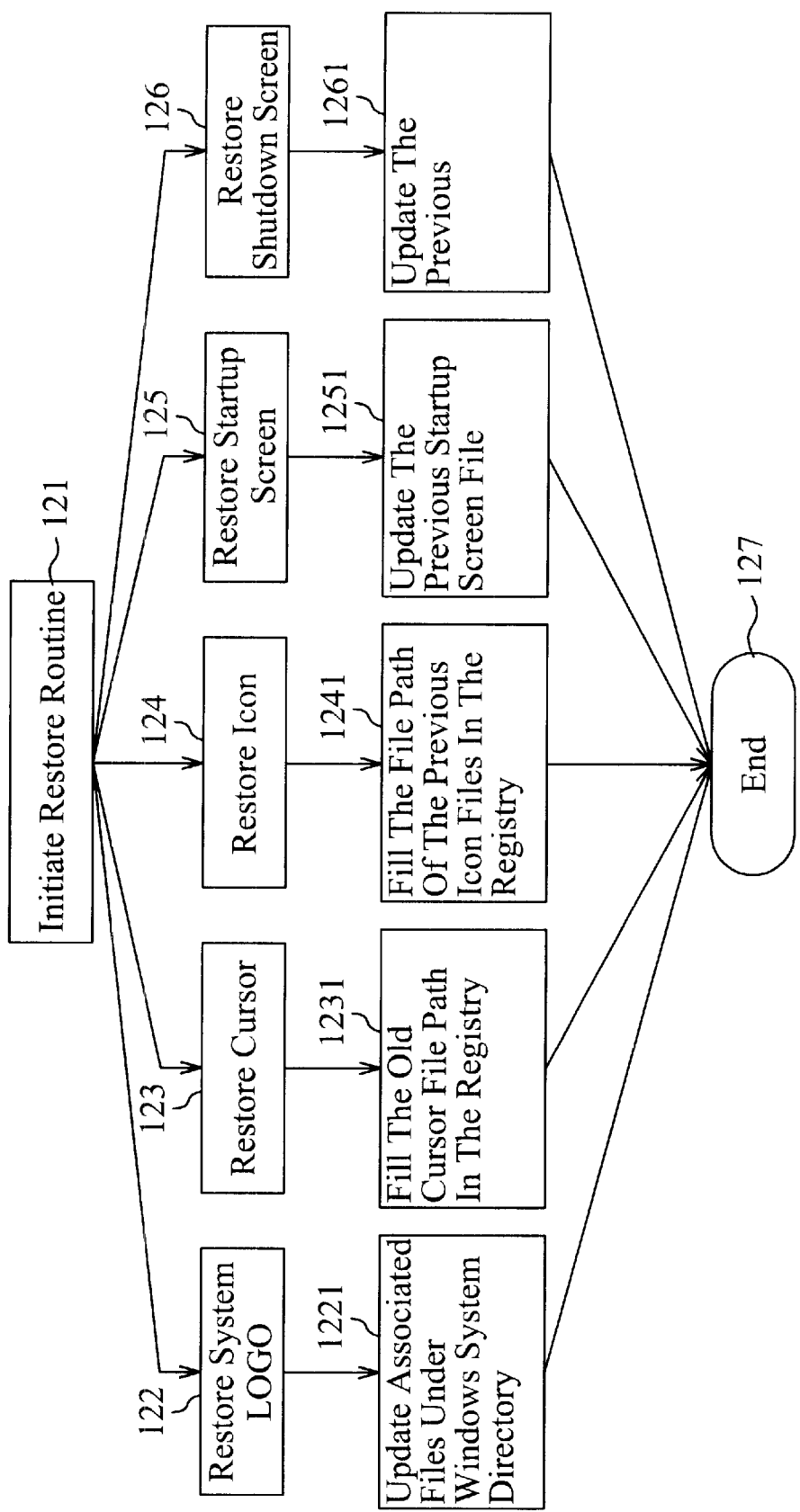
FIG. 12 is a flow diagram of the Recover routine.

9. Restore routine: Refer to FIG. 12, when the menu item of Restore is selected, the interface manager 15 will pop up a floating menu for the user to select which window item to resume. If the user wants to restore a previous graphic representation of a window item, he may simply click on an associated item of the floating menu. For example, step 122, if the user clicks the menu item of System LOGO, the System LOGO Restore routine will be activated by performing step 1221. Step 1221, the system will update the files of oeminfo.ini and oemlogo.bmp under windows system directory.

Step 123, if the user clicks the menu item of Cursor, the Cursor Restore routine will be activated by performing step 1231. Step 1231, the old cursor file path will be filled in the registry of the window system 1231.

Step 124, if the user clicks the menu item of "Icon", the Icon Restore routine will be activated by performing step 1241. Step 1241, the file path of the old icon files will be filled in the registry under the window system directory.

Step 125, if the user clicks the menu item of Startup Screen, the Startup Screen routine will be activated by performing step 1251. Step 1251, the old Startup Screen file under the root directory of the main disk: "logo.sys" will be updated.

Step 126, if the user clicks the menu item of Shut down Screen, the Shut down Screen Restore Routine will be activated by performing step 1261. Step 1261, the old shut down screen file under windows system directory "logow.sys" will be updated.

Step 127, after finishing a Restore routine, the restore routine terminates and returns to the main menu of the Restore Routine. The user can continue to select next menu item for restore or stop.

With the interface manager 15 described above, the user can establish a personalized windows environment more quickly and conveniently.

The operations of the interface manager 15 can be controlled via conventional computer I/O programs, such as keyboard or mouse. It can also be activated via a key control implemented on the image information reading apparatus 11. For example, when the image information reading apparatus 11 is initially powered on to communicate with the computer system of the host computer 12, a plurality of default hot keys on the image information reading apparatus 11 can be configured according to the user-defined settings. Each hot key can be configured according to one of the actions defined in the interface manager 15. Clicking a hot key will activate a series of associated computer operations to perform the update routines. For example, when the hot key A is configured for performing the Screen Saver Update routine, the user need only to place a scanned object on the image information reading apparatus 11 and then press the hot key. The associated computer operations of the Screen Saver Update routine will be activated immediately in response to the commands of the configuration settings. Eventually, the interface manager 15 can be activated to perform a series of operations in response to the commands from the image information reading apparatus 11 without having to operate on the dialog box provided by the interface manager 15 on the display 16. Accordingly, even an end user who is not familiar with computer input/output interface control, can also quickly update the graphic representation of a designated window item by a single key touch.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A computer system implemented on a host computer for operating on a window system to update a graphic representation of a selected window item, said host computer connected to an image information reading apparatus and having an image capturing manager for communicating with said window system and said image information reading apparatus, comprising:

an image cropping manager for providing a cropped image by cropping a scanned image transmitted from said image capturing manager according to a size requested by a user; and an interface manager for providing a plurality of menu items each associated with at least a dialog box for setting said cropped image as a default image of a selected window item, wherein said plurality of menu items is selected from the group consisting of Startup Screen, Wall Paper, System LOGO, Icon, Cursor, Screen Saver, Shutdown Screen, Theme, and Restore.

2. The computer system as claimed in claim 1, further comprising:

a plurality of configuration settings on a housing of said image information reading apparatus, each of said configuration settings associated with at least one of said plurality of menu items.

3. A method implemented on a computer system for operating upon a window system to update a graphic representation of a selected window item, said host computer connected to an image information reading apparatus and having an image capturing manager for communicating with said window system and said image information reading apparatus, comprising the steps of:

reading an image of an object;

cropping said image of said object from said image capturing manager according to a size required by a user;

saving said cropped image of said object;

providing a plurality of menu items each associated with at least a dialog box for invoking a series of operations in response to a user request; and setting said cropped image of said object as a default image of a selected window item in response to a user request, wherein said plurality of menu items is selected from the group consisting of Startup Screen, Wall Paper, System LOGO, Icon, Cursor, Screen Saver, Shutdown Screen, Theme, and Restore.

4. The method as claimed in claim 3, further comprising the step of:

providing a plurality of configuration settings on a housing of said image information reading apparatus, each of said configuration settings associated with at least one of said plurality of menu items.

5. The method as claimed in claim 4, wherein each of said plurality of configuration settings is for directly setting an image read by said image information reading apparatus as a default graphic representation of a selected window item.

6. A computer readable memory medium containing instructions for controlling a computer processor and operating upon a window system to update a graphic representation f a selected Window item, said host computer connected to an image information reading apparatus and having an image capturing manager for communicating with said window system and said image information reading apparatus, by performing the steps of:

reading an image of an object;

cropping said image of said object according to a size required by a user;

saving said cropped image of said object;

providing a plurality of menu items each associated with at least a dialog box for invoking a series of operations in response to a user request; and setting said cropped image of said object as a default image of a selected window item in response to a user request, wherein said plurality of menu items is selected from the group consisting of Startup Screen, Wall Paper, System LOGO, Icon, Cursor, Screen Saver, Shutdown Screen, Theme, and Restore.

7. A computer system implemented on a host computer for operating on a window system to update a graphic representation of a selected window item, said host computer connected to an image information reading apparatus and having an image capturing manager for communicating with said window system and said image information reading apparatus, comprising:

an image cropping manager for providing a cropped image by cropping a scanned image transmitted from said image capturing manager according to a size requested by a user;

an interface manager for providing a plurality of menu items each associated with at least a dialog box for setting said cropped image as a default image of a selected window item; and a plurality of configuration settings on a housing of said image information reading apparatus, each of said configuration settings being associated with at least one of said plurality of menu items.

8. A method implemented on a computer system for operating upon a window system to update a graphic representation of a selected window item, said host computer connected to an image information reading apparatus and having an image capturing manager for communicating with said window system and said image information reading apparatus, comprising the steps of:

reading an image of an object;

cropping said image of said object from said image capturing manager according to a size required by a user;

saving said cropped image of said object;

providing a plurality of menu items each associated with at least a dialog box for invoking a series of operations in response to a user request;

setting said cropped image of said object as a default image of a selected window item in response to a user request; and providing a plurality of configuration settings on a housing of said image information reading apparatus, each of said configuration settings being associated with at least one of said plurality of menu items.

* * * * *